US007882034B2

(12) United States Patent
Hug et al.

(10) Patent No.: US 7,882,034 B2
(45) Date of Patent: Feb. 1, 2011

(54) DIGITAL RIGHTS MANAGEMENT FOR CONTENT RENDERING ON PLAYBACK DEVICES

(75) Inventors: Joshua D. Hug, Seattle, WA (US); Bradley D. Hefta-Gaub, Seattle, WA (US)

(73) Assignee: RealNetworks, Inc., Seattle, WA (US)

( * ) Notice: Subject to any disclaimer, the term of this patent is extended or adjusted under 35 U.S.C. 154(b) by 1082 days.

(21) Appl. No.: 10/719,981

(22) Filed: Nov. 21, 2003

(65) Prior Publication Data
US 2005/0114896 A1 May 26, 2005

(51) Int. Cl.
*G06F 21/00* (2006.01)
(52) U.S. Cl. .............................. 705/52; 705/51; 705/59; 705/901; 705/902; 705/904; 705/908
(58) Field of Classification Search .................. 380/211
See application file for complete search history.

(56) References Cited
U.S. PATENT DOCUMENTS

| | | | | |
|---|---|---|---|---|
| 5,586,264 | A | * | 12/1996 | Belknap et al. .............. 725/115 |
| 5,629,980 | A | | 5/1997 | Stefik et al. |
| 5,655,144 | A | | 8/1997 | Milne et al. |
| 5,708,422 | A | * | 1/1998 | Blonder et al. .............. 340/5.41 |
| 5,857,020 | A | * | 1/1999 | Peterson, Jr. .................. 705/52 |
| 5,892,900 | A | | 4/1999 | Ginter et al. |
| 6,151,634 | A | | 11/2000 | Glaser et al. |
| 6,236,971 | B1 | | 5/2001 | Steffik et al. |
| 6,434,621 | B1 | | 8/2002 | Pezzillo et al. |
| 6,560,651 | B2 | | 5/2003 | Katz et al. |
| 6,597,961 | B1 | | 7/2003 | Cooke |
| 6,842,906 | B1 | | 1/2005 | Bowman-Amuah et al. |
| 2002/0013784 | A1 | * | 1/2002 | Swanson .................. 707/104.1 |
| 2002/0157034 | A1 | | 10/2002 | Sagar et al. |
| 2003/0163684 | A1 | | 8/2003 | Fransdonk |
| 2003/0189879 | A1 | * | 10/2003 | Ishii et al. ................ 369/30.03 |
| 2004/0139312 | A1 | * | 7/2004 | Medvinsky .................. 713/150 |
| 2005/0010531 | A1 | | 1/2005 | Kushalnagar et al. |
| 2005/0022019 | A1 | * | 1/2005 | Medvinsky et al. ......... 713/201 |
| 2005/0203959 | A1 | | 9/2005 | Muller et al. |
| 2006/0085351 | A1 | | 4/2006 | Hug |

OTHER PUBLICATIONS

International Search Report with Written Opinion, dated Jul. 3, 2008, received in international patent application No. PCT/US2006/38496, 7 pgs.

* cited by examiner

*Primary Examiner*—Andrew J. Fischer
*Assistant Examiner*—Joshua Murdough
(74) *Attorney, Agent, or Firm*—Kory D. Christensen; Stoel Rives LLP

(57) ABSTRACT

In one embodiment, an elapsed playback time associated with a digital playback device is determined and compared to an allotted playback time for the device. In the event the elapsed and allotted playback times satisfy a predetermined relationship with respect to one another, further content playback on the device may be denied or otherwise regulated until content playback rights intrinsic to the device are renewed or "recharged".

28 Claims, 10 Drawing Sheets

DIGITAL RIGHTS MANAGEMENT FOR CONTENT RENDERING ON PLAYBACK DEVICES

BACKGROUND OF THE INVENTION

With advances in integrated circuit, microprocessor, networking and communication technologies, an increasing number of digital computing devices are being networked together to facilitate the exchange of electronic information. As a result, traditional audio and video content providers such as radio and television studios, recording associations, independent recording artists, and so forth, are increasingly turning to digital communication networks such as the Internet for dissemination and distribution of media content. As a result, protection of the intellectual property rights associated with such digital content has become a concern.

Depending upon the digital rights management (DRM) system employed, a user of a client device (i.e., a consumer) may subscribe to one or more subscription services offered by a content provider. Depending upon the contractual relationship between the user and the content provider as well as the DRM system employed, the user may be permitted to download a certain quantity or type of audio and/or video content from the content provider. Depending upon the particular business model implemented by the content provider for example, some, all or none of the content made available to the user may be copy protected through e.g., the use of encryption.

In order for a user to download or otherwise transfer content to a client device, the user might first be required to register the client device with the content provider. As part of the registration process, the content provider may generate an encryption key that is unique to the user and will be used by the provider to encrypt licensed content for download by the user. Moreover, the provider will typically transmit a license (including the unique user encryption key) to the user's client device where it is securely stored (e.g., in user inaccessible memory).

Content licenses may grant the user access to one or more content items, and may be bound to both the user and the associated client device. Conventional DRM systems typically limit the number of times a particular content item may be copied from one client device to another. For example, under such conventional DRM systems, the content provider may allow the user to only playback their content on up to "N" registered devices. Unfortunately however, if the user has already registered "N" devices and attempts to playback their content on an additional (e.g., "N+1") device, they will typically be asked to un-register one of their previously registered devices before an additional license will be granted. By un-registering a device, the user's license is typically removed causing playback of the user content to be disabled until the user chooses to re-license their machine. Unfortunately, however, this is not very convenient and is often confusing to the user.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF EMBODIMENTS OF THE INVENTION

In the description to follow, various aspects of the present invention will be described, and specific configurations will be set forth. However, the present invention may be practiced with only some or all aspects, and/or without some of these specific details. In other instances, well-known features are omitted or simplified in order not to obscure the present invention.

The description will be presented in terms of operations performed by a processor based device consistent with the manner commonly employed by those skilled in the art to convey the substance of their work to others skilled in the art. As is well understood by those skilled in the art, the quantities take the form of electrical, magnetic, or optical signals capable of being stored, transferred, combined, and otherwise manipulated through mechanical, electrical and/or optical components of the processor based device.

Various operations will be described as multiple discrete steps in turn, in a manner that is most helpful in understanding the present invention, however, the order of description should not be construed as to imply that these operations are necessarily order dependent. In particular, these operations need not be performed in the order of presentation.

The description repeatedly uses the phrase "in one embodiment", which ordinarily does not refer to the same embodiment, although it may. The terms "comprising", "including", "having", and the like, as used in the present application, are synonymous.

Overview

In accordance with one aspect of the present invention, digital playback devices equipped with intrinsic digital content consumption rights are provisioned with rights monitoring logic to influence playback of digital content based upon a device usage model. In one embodiment, users may download content items to digital playback devices freely without concern as to the number of times the content has been previously downloaded or rendered by an authorized device, or the number of playback devices to which the content has been downloaded. In one embodiment, an elapsed playback time associated with a digital playback device is determined and compared to an allotted playback time for the device. In the event the elapsed and allotted playback times satisfy a predetermined relationship with respect to one another, further content playback on the device may be denied or otherwise regulated until content playback rights intrinsic to the device are renewed or "recharged". In a further aspect of the invention, a destructive rights transfer protocol is utilized to facilitate a non-aggregating user registration process for playback devices.

Figure 1:
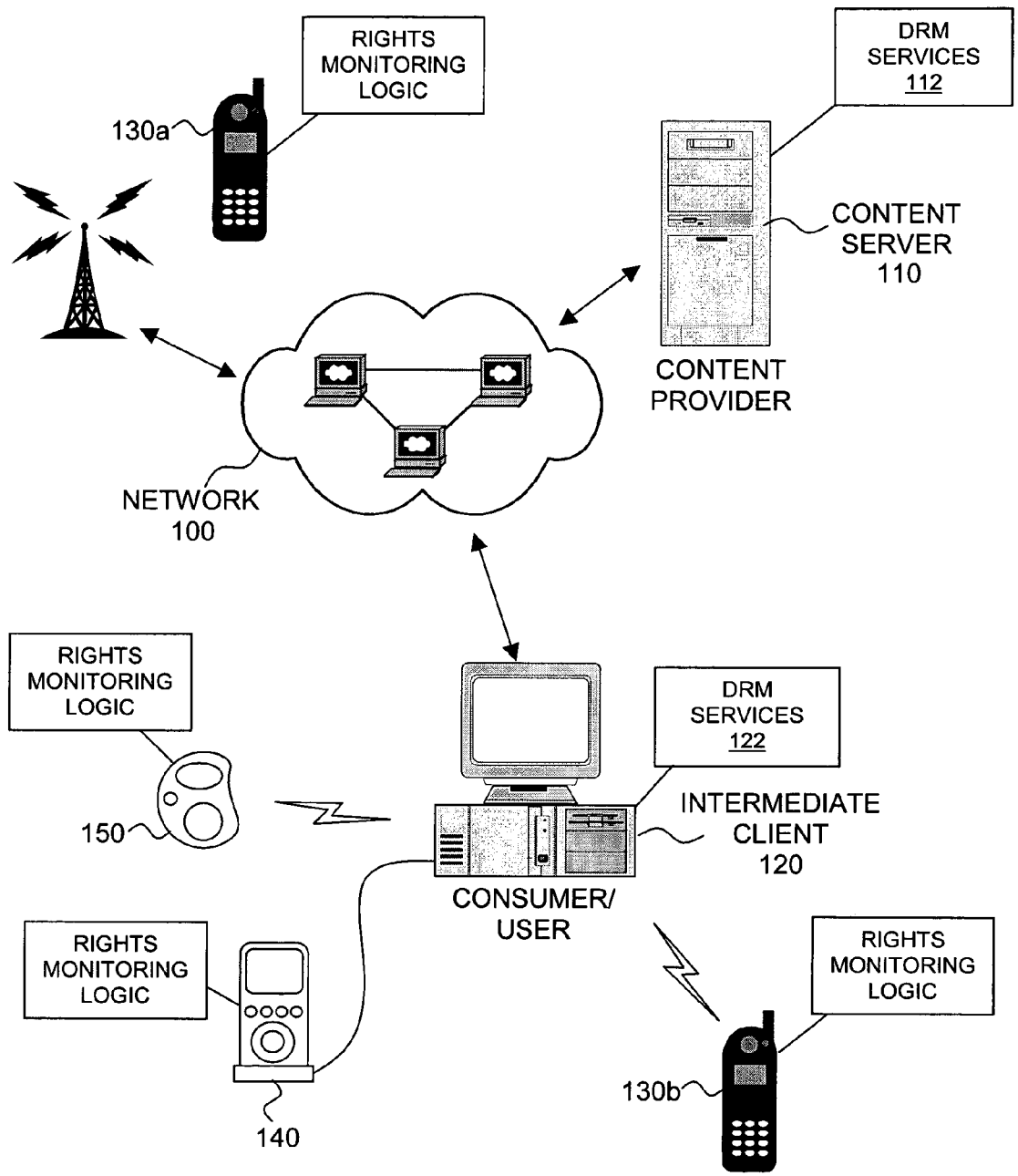
FIG. 1 is a block diagram illustrating an architectural overview within which the present invention may be practiced in accordance with one embodiment.

FIG. 1 is a block diagram illustrating an architectural overview within which the present invention may be practiced in accordance with one embodiment. Content server 110, digital playback devices 130, 135, 140 and 150, and intermediate client device 120 may be interconnected to each other and networking fabric 100 as shown. Networking fabric 100, may represent one or more interconnected data networks, such as, but not limited to the Internet or World Wide Web.

In accordance with one embodiment of the invention, content server 110 represents one or more devices equipped with digital rights management (DRM) services 112 to facilitate distribution of secured and non-secured digital content items by a content provider. The content items may include, but are not limited to audio and video (including motion video and still images) clips, files, and streams, whether alone or combined, that may be accessible by a user agent/client. In one embodiment of the invention, content server 110 stores and/or distributes content items such as audio and video files and/or streams to client devices (e.g. devices 120 and 130) on behalf of various third parties such as radio and television studios, recording associations, recording artists, as well as other audio and/or video publishers (not shown). In connection with such digital distribution, content server 110 may utilize one or more sharing protocols including, but not limited to the hypertext transfer protocol (HTTP) and the real time streaming protocol (RTSP). Similarly, content server 110 may utilize one or more data encoding and/or encryption algorithms including but not limited to those in accordance with the MPEG-1 layer 3 audio (MP3), and MPEG-4 standards (available at e.g. http://www.chiariglione.org/mpeg/standards.htm), Windows Media Audio, RealVideo, RealMedia and RealAudio, Advanced Audio Coding (MC), and the Adaptive Multi-Rate (AMR) speech CODEC to name more than a few.

Playback devices 130, 135, 140 and 150 as well as intermediate client device 120 may each represent a broad range of digital systems known in the art, including but not limited to devices such as wireless mobile phones, palm sized personal digital assistants, digital audio and/or video playback devices (whether portable or fixed in location), notebook computers, desktop computers, set-top boxes, and game consoles. In one embodiment of the invention, a user may download one or more content items from content server 110 (or similar content storage server) to intermediate client device 120, or from content server 110 directly to a playback device such as playback device 130 as shown. In one embodiment of the invention, intermediate client device 120 is incorporated with DRM services 122 to facilitate content item rights management of content catalogues stored on intermediate client device 120 or associated devices such as playback devices 135, 140 and 150. Playback devices 135, 140 and 150 may each be coupled to intermediate client device 120 via wired or wireless connections including, but not limited to a Universal Serial Bus connection, an Institute of Electrical and Electronic Engineers (IEEE) type 1394 or 802.11 compliant connection, a WiFi or Bluetooth connection, and the like.

In one embodiment, one or more of playback devices 130, 135, 140 and 150 may be advantageously equipped with rights monitoring logic incorporating teachings of the present invention to monitor and regulate content playback on the respective devices. In accordance with one embodiment of the invention, one or more of playback devices 130, 135, 140 and 150 may be granted an allotted playback duration for which each respective device may freely render a body of content. The term "render" as used herein broadly refers to the act or process of displaying, generating, or causing to display/generate an image or graphical representation in the case of visual rendering, as well as generating one or more sounds or tones or digital representations of the sounds or tones in the case of aural rendering. The body of content that may be rendered may represent all content accessible to a given playback device or it may be restricted to one or more classes or categories of content. For example, the allotted playback duration may represent a duration for which a particular playback device may freely render content associated with a particular artist or recording label. Furthermore, the allotted playback duration may be associated with a selected one of multiple independently governed sets of content. The right representing the allotted playback duration may be intrinsic to the playback device, or it may be represented by rights provided to the playback device by the content provider or third party as part of a subscription or other transactional agreement. The allotted playback duration may vary depending upon e.g., the type of playback device involved, the manufacturer of the device, the type of agreement in place between a user and a content provider, and so forth.

In one embodiment, one or more of playback devices 130, 135, 140, and 150 equipped with rights monitoring logic may further recognize an elapsed playback duration. The elapsed playback duration may represent an amount of time or quantity of data consumed by a playback device while actually rendering a body of content. The body of content may represent an amount of time or quantity of data associated with all content accessible by the device or only a particular class and/or category of content.

In one embodiment, if the elapsed playback duration for which content has been rendered or played back on a particular device is equal to or exceeds an allotted playback duration for the device, additional playback of content on that particular playback device may be prevented. In one embodiment playback of only a particular class of content such as encrypted content may be prevented, whereas in an alternative embodiment, playback of all content by the device may be prevented. Alternatively, if the elapsed playback duration for which content has been rendered or played back on a particular device is equal to or exceeds an allotted playback duration for the device, the quality of content playback may be rendered at a decreased level of quality.

In one embodiment, playback rights associated with a playback device, such as playback devices 130, 135, 140 and 150 incorporated with teachings of the present invention, may be recharged so as to facilitate continued content playback by the device. In one embodiment, content server 110 may transmit a recharge token to one or more playback devices to recharge playback rights intrinsic to the device(s). In one embodiment, such a recharge token may cause playback devices incorporated with the teachings of the present invention to either increase their allotted playback duration, decrease their allotted playback duration, or reset their elapsed playback duration so as to facilitate further content playback. In one embodiment, the recharge message may be solicited from the content server by the playback device periodically, pseudo randomly, or automatically upon the allotted playback duration being met. Similarly, the recharge message may be proactively offered or transmitted to the playback device from the content server either periodically or pseudo randomly.

User Registration

Depending upon the digital rights management (DRM) system implemented by a given content provider, users may be required to license secure content before the content may be downloaded and/or rendered by the user. Such user-licensed content is typically "personalized" or "bound" to the licensed user and their playback device, such as intermediate client device 120, at the time it is downloaded from the content provider. In order for a user to be able to license/download content, the user may be required to first register with the content provider (e.g. via content server 110). For example, users may be required to set up a subscription based account through which the user may pay a fee in exchange for the ability to download and/or render one or more secure content items. During such a user registration process, a backend server account typically hosted by the content provider or third party may be created in which the user is associated with a unique user identifier and a user key. In one embodiment the user key is provided to the user in the form of a license that is then stored in a user inaccessible area of memory on the client device.

Playback Device Registration

Normally, if a user wishes to utilize any of their previously downloaded content catalogue on additional playback devices other than the playback device used to perform the download (e.g., intermediate client device 120), they may have to register such supplemental playback devices with either the intermediate client device or the content provider before being able to do so. For example, a content provider may allow a user to play back their content on up to "N" registered devices. Moreover, with existing DRM systems it is common for each playback device to contain at least one user license/key for each registered user of the device. Unfortunately, the number of user licenses/keys stored on a given playback device can rapidly aggregate as more users download licensed content to the playback device. Typically, even if the users are removed or un-registered from the intermediate device, the user licenses/keys would remain on the playback devices. In accordance with the teachings of at least one embodiment of the present invention, playback devices incorporated with rights monitoring logic described herein perform a destructive rights transfer protocol in connection with a non-aggregating user registration process. In one embodiment, all users registered on a particular playback device are removed every time a new registration message is received from an intermediate device. The new registration message may then facilitate registration of all or only a specified subset of users from the intermediate device.

Figure 7:
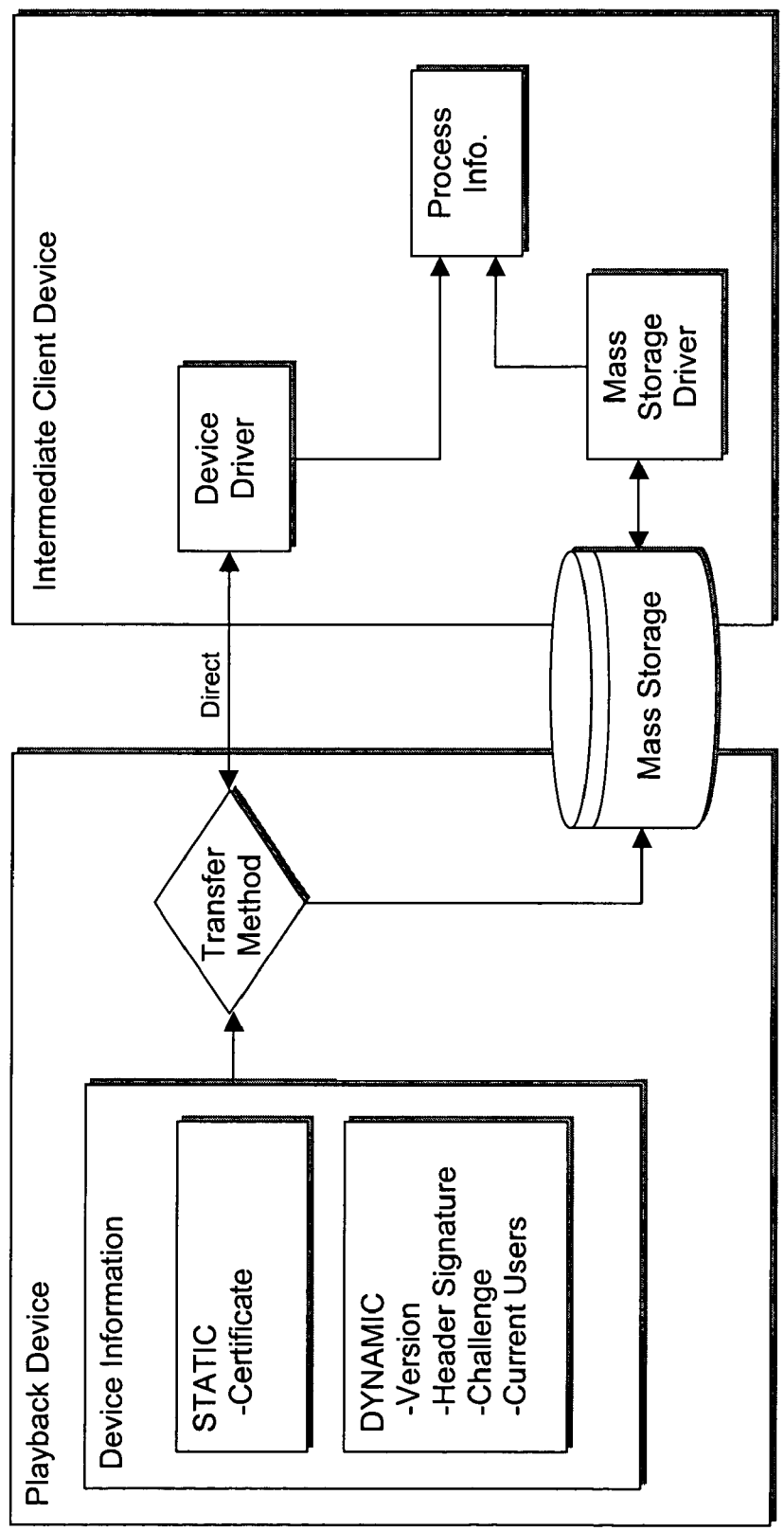
FIG. 7 is a block diagram illustrating an example architecture for exchanging information between a playback device and an intermediate client device in accordance with one embodiment of the invention.

Reference is now drawn to FIG. 7, where a block diagram is shown illustrating an example architecture for exchanging information between a playback device and an intermediate client device in accordance with one embodiment of the invention. In one embodiment, messages containing static and/or dynamic information may be transferred between the playback device and the intermediate client device. For example, playback devices may push information to the intermediate client device directly via a tailored device driver, or the devices may exchange messages indirectly via drop boxes on dumb storage devices.

The dynamic information may be generated by the playback device on a per-message basis. In one embodiment, dynamic information generated on the playback device is updated after each message exchange between the playback device and the intermediate client device. Such dynamic information may include but is not limited to message and/or protocol version information, a unique device identifier to identify the particular playback device, digital signature and/or challenge information to facilitate secure information exchange between the devices, and a list of users authorized to consume content on the playback device. In one embodiment, the dynamic information may include an identifier indicating that the playback device is equipped with rights recharge functionality. In one embodiment a rights recharge token may be delivered to the playback device in the form of a registration message (described below).

Static information may be stored on the playback device in the form of a digital certificate. Such a digital certificate may be digitally signed by the content provider and it may be associated with highly confidential information such as one or more decryption keys. In one embodiment, the decryption keys may be embedded in user inaccessible (e.g. trusted) code on the playback device. In other embodiments, the decryption keys could be protected by a Network Service key. Digital certificates may vary slightly from one playback device to another depending upon a number of factors including e.g. whether asymmetric or symmetric keys are utilized. An asymmetric certificate for example, may contain a n-bit public key that is bound to the playback device for the purpose of content encryption. A symmetric certificate on the other hand may contain a playback device-specific private symmetric key that is in turn encrypted with a public trusted key from the content provider. The intermediate client device may then decrypt this key using a trusted private key from the device or content provider that is protected by tamper resistant code.

Figure 9:
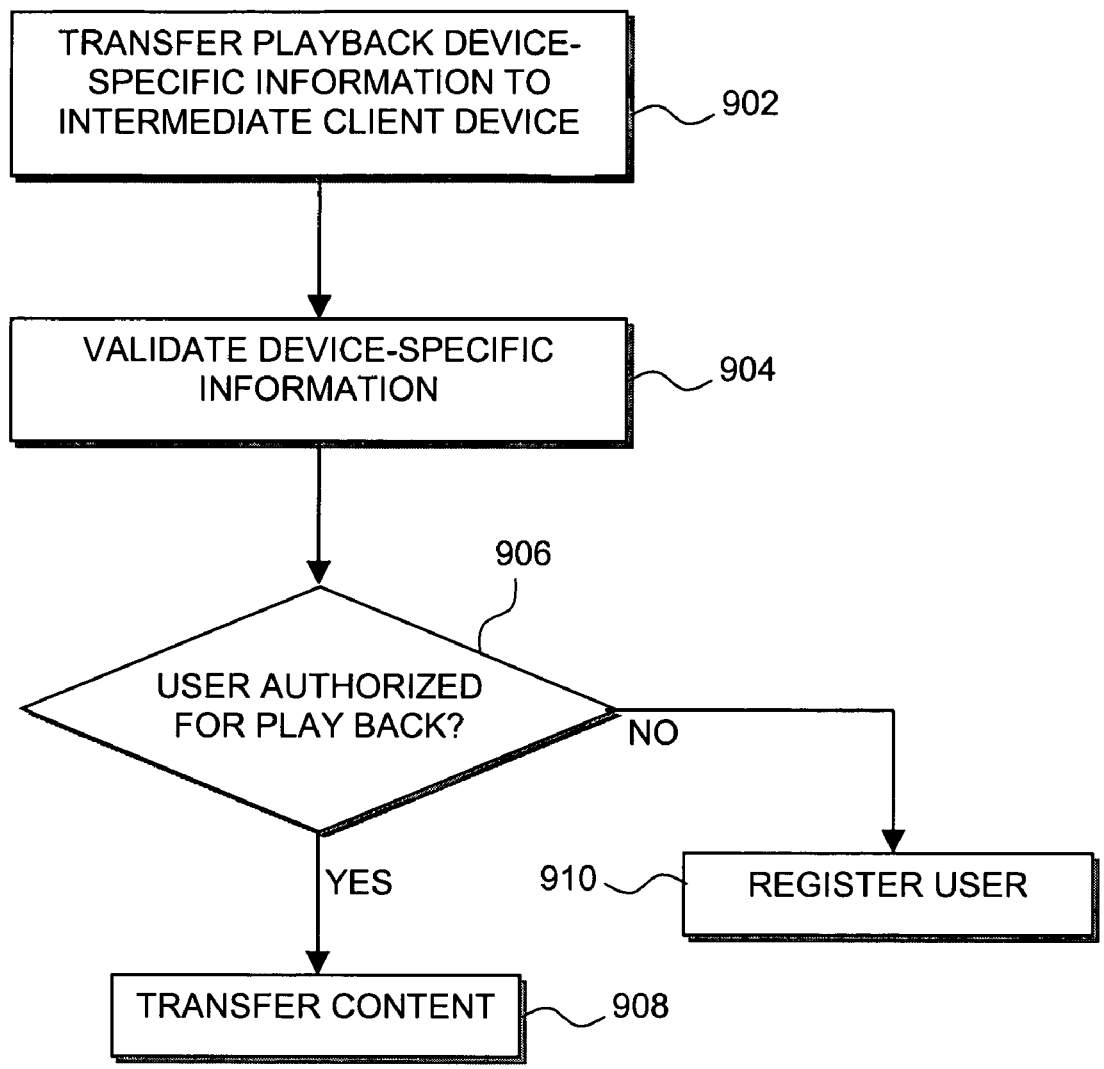
FIG. 9 is a flow diagram illustrating one embodiment of a user registration process.

FIG. 9 is a flow diagram illustrating one embodiment of a user registration process. In the illustrated embodiment, the process begins with device-specific information being transferred from a playback device, such as playback devices 135, 140 and 150, to an intermediate client device, such as intermediate client 120, block 902. The device-specific information may be transmitted in response to a user-initiated action such as a request by the user to render content on the supplemental playback device, or in response to a device-initiated action. The device-specific information may take the form of digital certificates that are in turn used by the intermediate client device to generate registration messages for transmission to one or more playback devices.

Once the intermediate client device has received/retrieved playback device-specific information from a playback device, the intermediate client device may verify that such information is valid, block 904. The intermediate client device may further determine whether the user associated with a content playback or transfer request is authorized for content playback on the playback device, block 906. A user may be deemed authorized or not authorized based upon the presence or absence of appropriate authentication information. If the user is deemed to be authorized for content playback on the playback device, the content may then be transferred freely to the playback device without the intermediate client performing a registration update, block 908. However, if the user is not authorized for content playback on the playback device (block 906), the intermediate client device may proceed to register the user for content playback on the playback device, block 910.

Playback Device Information

As mentioned above, playback devices may generate dynamic device-specific information which may be advertised by a playback device to an intermediate client device for pickup. Playback devices may push the data to a mass storage device for the intermediate client device to read, or playback devices may generate the device information and a challenge dynamically for each request received from an intermediate client device.

In one embodiment, a data structure containing the dynamic information may include various device-specific information, current user information and user-identifier information. For example, a playback device may generate a data structure that includes a unique device identifier to differentiate the particular playback device from other playback devices, a unique (e.g. non-repeating) challenge value to prevent replay attacks, and a signed hash value of the data structure that is encrypted with the private key or symmetric secret held by the playback device. The data structure may further identify the current users authorized to play back content on the respective playback device.

Registration Message

After the intermediate client device has retrieved or received the playback device-specific information, it may generate a registration message which is then transferred to the playback device to register current users on the intermediate client device with the playback device. The registration message may take various forms and may contain various data structures and depending upon the particular implementation. In one embodiment, the registration message may contain data indicating the size of the message, the number of users for a given playback device, corresponding user keys, and a device identifier specific to the target playback device. Additionally, the message may be digitally signed through the use of a secure hash algorithm such as Secure Hash Algorithm 1 (SHA-1) In one embodiment, the playback device may validate the registration message by comparing one or more values contained within the registration message with one or more expected values. Alternatively, the registration message or data derived therefrom may be sent to a Network Service which may operate to validate the registration message. In one embodiment, one or more Network Services may be utilized to calculate a Hash Message Authentication Code (HMAC) based upon data derived from the device certificate.

Device Message Processing

Figure 10:
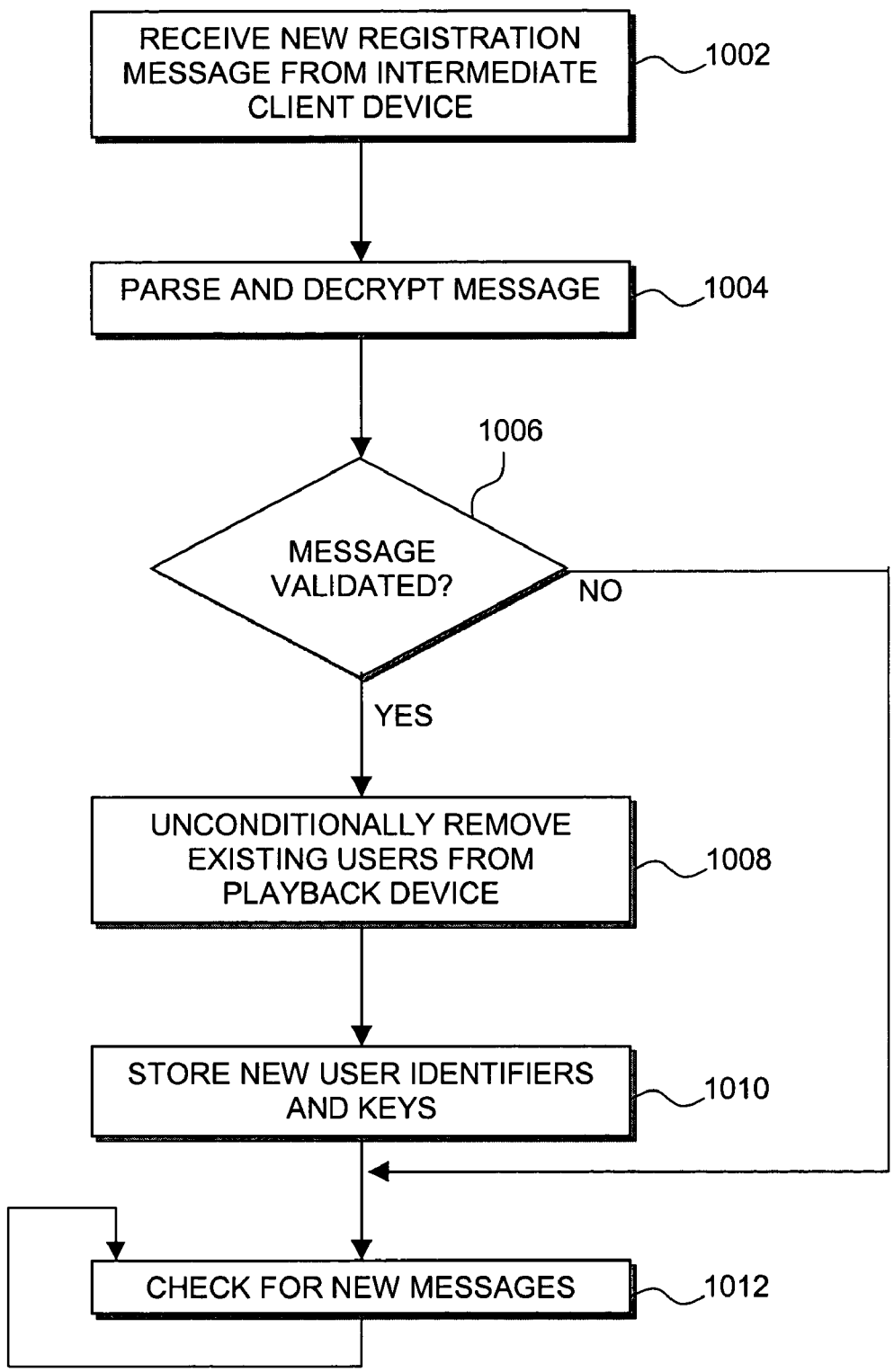
FIG. 10 is a flow diagram illustrating an example operational flow for message processing on a playback device in accordance with one embodiment of the invention.

FIG. 10 is a flow diagram illustrating an example operational flow for message processing on a playback device in accordance with one embodiment of the invention. In the illustrated embodiment, the process begins with the playback device receiving a new registration message from an intermediate client device, block 1002. Upon receipt of the message, the playback device may then parse and decrypt the message, block 1004. Thereafter, the playback device may validate the registration message by e.g. verifying that a device identifier and challenge data provided in the message match an actual device identifier and internally stored challenge, respectively (block 1006). If the message is not validated, the registration process effectively ends with the playback device continuing to check for the presence of new messages, block 1012. However, if the message is validated, all reference to any users that might have been registered on the playback device via prior messages is unconditionally removed, block 1008. The playback device may then proceed to store the new user identifiers and corresponding user keys in a user inaccessible storage area (block 1010) and continue to check for new messages, block 1012. Thus, in accordance with one embodiment of the invention, upon user registration, all existing users of a given playback device are unconditionally removed from the devices to avoid key aggregation on the playback device.

Content Playback

Figure 2:
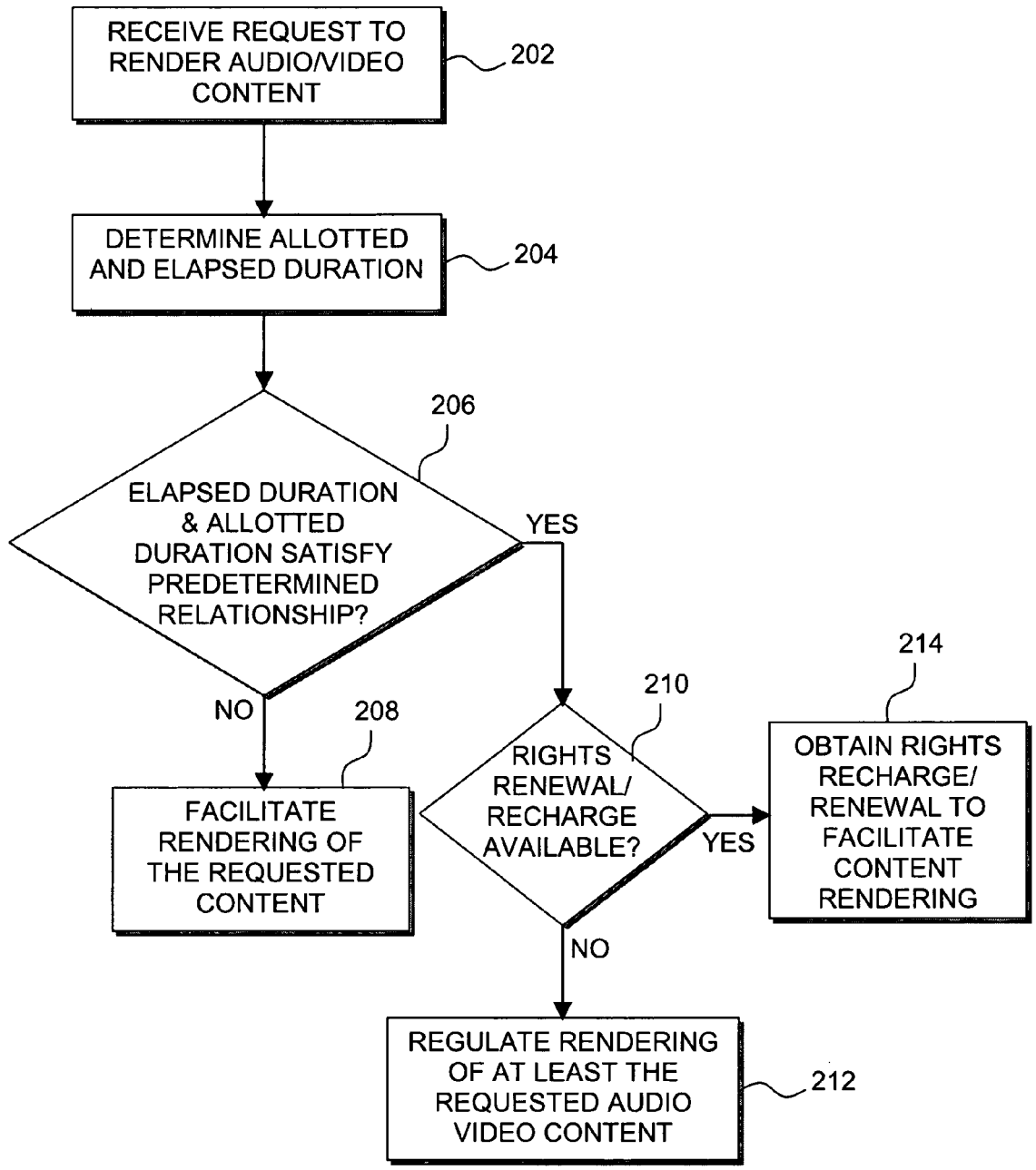
FIG. 2 illustrates an example operational flow of the rights monitoring logic in accordance with one embodiment of the present invention.

Reference is now made back to FIG. 2 where an example operational flow of rights monitoring logic is illustrated in accordance with one embodiment of the present invention. As shown, operation of a playback device equipped with the rights monitoring logic of the present invention may include the device first receiving a request to render audio/video content, block 202. The request may e.g. be initiated by a user via a user input device such as a mouse, or the request may be initiated by a software routine executing, e.g. on the playback device. An allotted playback duration and an elapsed playback duration may then be determined, block 204. The allotted playback duration may represent an amount of time or quantity of data for which a particular device has been granted playback privileges with respect to a particular body of content. The allotted playback duration for a given playback device may be determined from data stored on the playback device or by data stored by the content server. In one embodiment, the elapsed playback duration represents the amount of time or quantity of data consumed by a particular device while actually rendering a particular body of content. In one embodiment, the elapsed playback duration is stored on the playback device and may be measured with respect to a variety of reference points. For example, the elapsed duration may be measured with respect to the point at which the device was first powered on, the point at which the device was last powered on, the point at which the rights of the device were last renewed or recharged, e.g., by the content server, and so forth.

Once the elapsed and allotted playback duration have been identified, a determination may be made as to whether the elapsed duration and allotted playback duration satisfy a predetermined relationship with respect to each other, block 206. For example, in one embodiment a determination may be made as to whether the elapsed playback duration is equal to or less than the allotted playback duration for a given device. In an alternative embodiment, a determination may be made as to whether rendering of the requested content would cause the elapsed playback duration to exceed the allotted playback duration for a given device. If the stipulated relationship of block 206 is not satisfied (e.g., the elapsed playback duration does not, or will not exceed the allotted playback duration), rendering of the requested content is facilitated, block 208. However, if the stipulated relationship of block 206 is satisfied, a further determination may be made as to whether a rights renewal/recharge is available for the device, block 210. If a rights renewal/recharge is not available, rendering of at least the requested content may be regulated by the playback device, block 212. In one embodiment, rendering of at least the requested content may be prevented by the playback device if a rights renewal/recharge is not available. In one embodiment, if a rights renewal/recharge is not available, rendering of all content stored on the playback device in addition to the requested content may be denied. A rights recharge may not be available for a variety of reasons, including but not limited to constraints associated with a particular contractual relationship existing between the user and the content provider, as well as the inability of the playback device to communicate with the content server. Lastly, if it is determined at block 210 that a rights renewal/recharge is available, the playback device may receive a recharge message from the content server so as to facilitate rendering of the requested content, block 214. Although in FIG. 2 the recharge of playback rights is illustrated as being obtained after the stipulated relationship between the elapsed duration and allotted duration has been determined, the rights recharge may nonetheless occur at other times during the operation of the device without departing from the spirit and scope of the invention.

Figure 3:
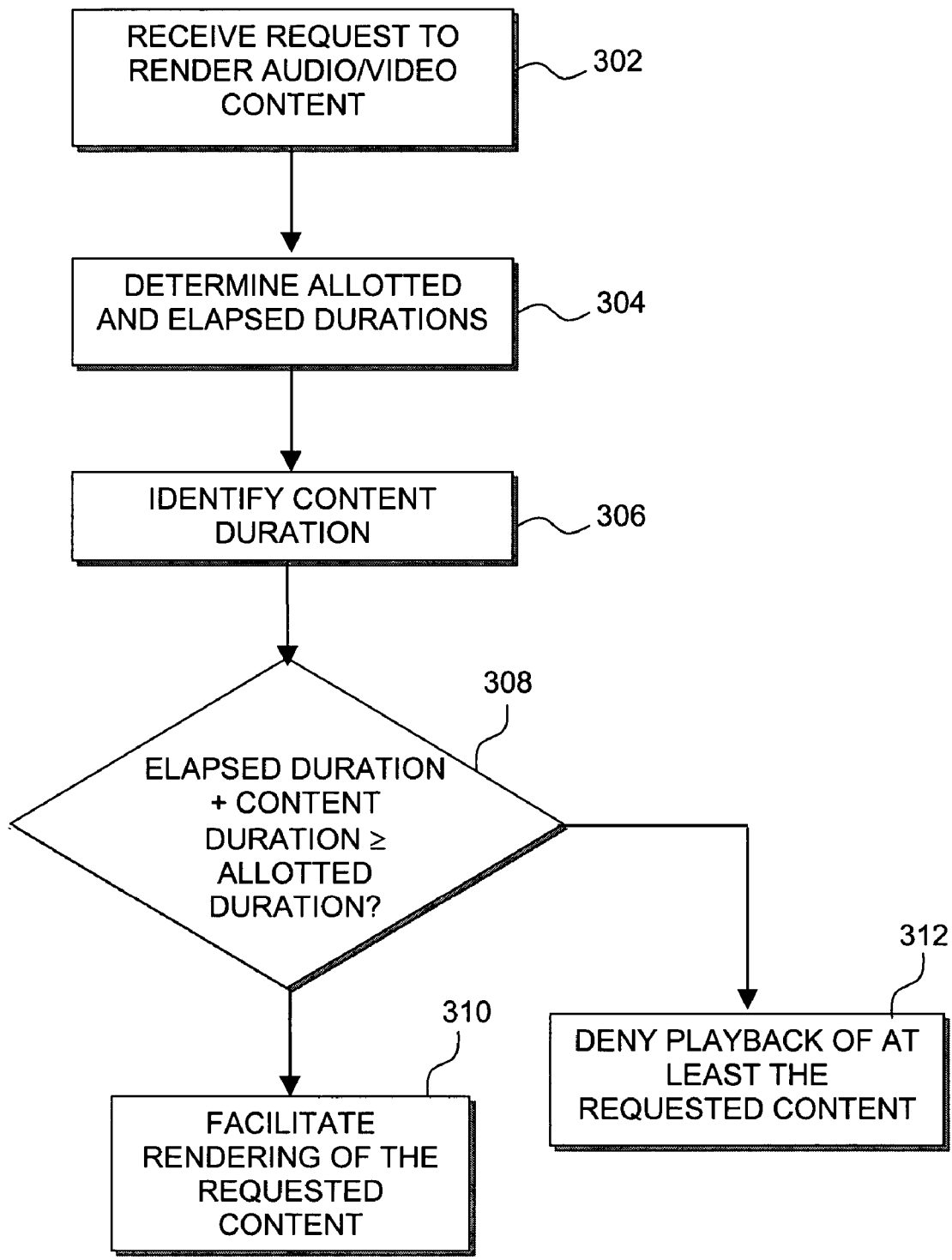
FIG. 3 illustrates an example operational flow of the rights monitoring logic in accordance with an alternative embodiment of the present invention.

FIG. 3 illustrates an example operational flow of the rights monitoring logic in accordance with an alternative embodiment of the present invention. As shown, operation of a playback device equipped with the rights monitoring logic of the present invention may include the device receiving a request to render content, block 302. An allotted playback duration and an elapsed playback duration for the playback device may then be determined, block 304. In addition, a content duration associated with rendering of the requested content may also be identified, block 306. Content duration may include a quantity of data such as a file size, or an amount of time, e.g. as indicated by a track length. At block 308, a determination is made as to whether the elapsed playback duration, when added to the identified content duration, would be equal to or exceed the allotted playback duration for the device, block 308. If the combination of the elapsed playback duration and the content duration would not be equal to or exceed the allotted playback duration, rendering of the requested content is facilitated at block 310. Otherwise, if the combination of the elapsed playback duration and the content duration would be equal to or exceed the allotted playback duration, rendering of at least the requested content may instead be denied, block 312. In one embodiment, rendering of all content on the playback device may be denied.

Figure 4:
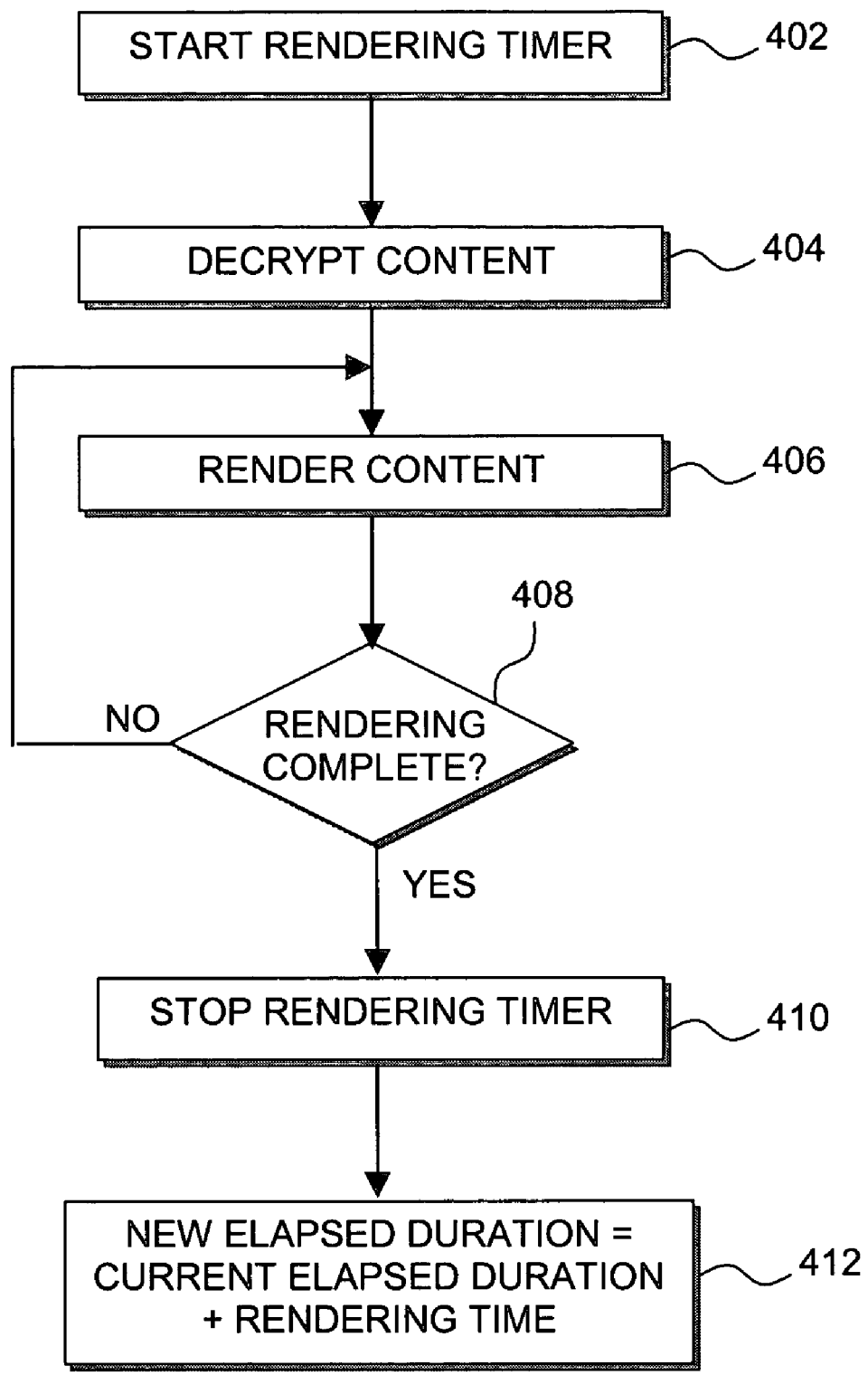
FIG. 4 illustrates an example operational flow for updating the elapsed playback duration of a playback device in accordance with one embodiment of the invention.

FIG. 4 illustrates an example operational flow for updating the elapsed playback duration of a playback device in accordance with one embodiment of the invention. In the illustrated embodiment, upon receiving a request to render a content item, a content rendering timer may be started (block 402), and the requested content decrypted (block 404) before rendering of the requested content begins at block 406. The playback device may then continue to render the requested content in it's entirety (blocks 406-408). Once rendering of the requested content is complete, the rendering timer may be stopped (block 410) and the current elapsed playback duration added to the content render time (as e.g. determined by the rendering timer), resulting in a new elapsed playback duration for the playback device (block 412). In an alternative embodiment, the allotted playback duration may merely be incrementally decreased until it reaches zero or an otherwise determined value. At which time, further content rendering by the playback device may be denied.

Figure 5:
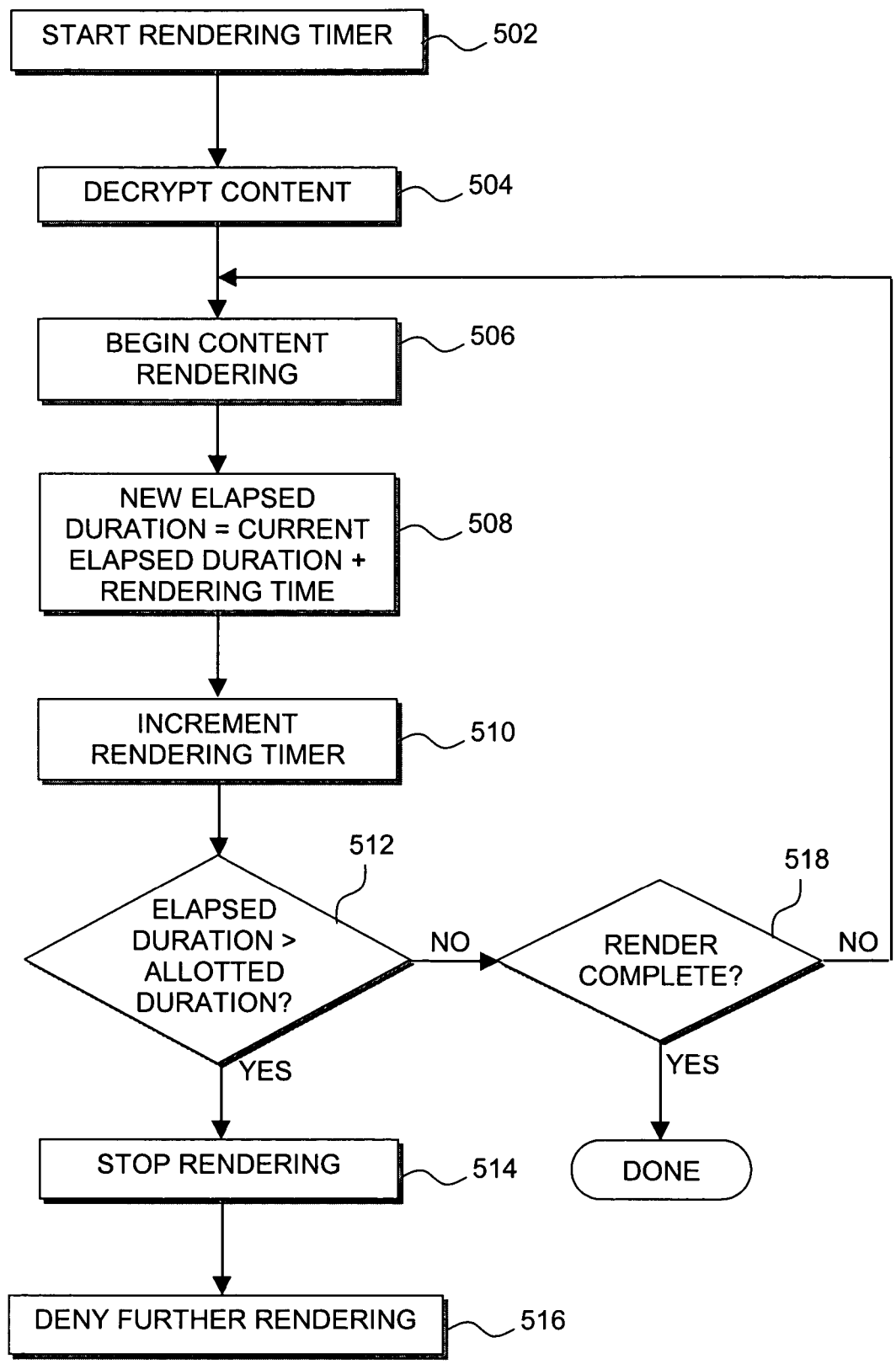
FIG. 5 illustrates an example operational flow for updating the elapsed playback duration of a playback device in accordance with an alternative embodiment of the invention.

FIG. 5 illustrates an example operational flow for updating the elapsed playback duration of a playback device in accordance with an alternative embodiment of the invention. In a manner similar to the operational flow of FIG. 4, the operational flow depicted in FIG. 5 begins with a content rendering timer being started (block 502) and the requested content being decrypted (block 504) before rendering of the requested content begins at block 506. Thereafter the current elapsed playback duration for the playback device added to the render time (as e.g. determined by the rendering timer), resulting in a new elapsed playback duration for the playback device, block 508. At block 510, the rendering timer may be incremented and a determination made as to whether the new elapsed playback duration is greater than the allotted playback duration, block 512. If the elapsed playback duration is greater than the allotted playback duration, rendering may be stopped (block 514) and further rendering denied (block 516). However, if at block 512 it is determined that the elapsed playback duration is not greater than the allotted playback duration, rendering may continue at block 518 until either content rendering is complete or the elapsed playback duration exceeds the allotted playback duration.

Although FIGS. 2-5 illustrate various example operational flows for embodiments of the present invention, the disclosure is not intended to be limited to such illustrated embodiments. For example, although both elapsed playback duration and allotted playback duration have been described, embodiments of the present invention may not necessarily implement both values. In an alternative embodiment, a remaining playback duration may be identified which represents an amount of time for which a playback device may be authorized to render content. As content is rendered on the playback device, the remaining playback duration may be decreased until the remaining playback duration expires (e.g., reaches zero or an otherwise determined value). Once the remaining playback duration expires, further content rendering on the device may be denied. In one embodiment, upon the remaining playback duration expiring, the playback device may enter an operating state in which reduced device functionality or reduced rendering quality is manifested.

In one embodiment of the invention, one or both of the elapsed playback duration and the allotted playback duration may be indicated to the user of a playback device. In one embodiment, the elapsed playback duration and allotted playback duration may be indicated separately, whereas in an alternative embodiment, elapsed playback duration and allotted playback duration may be indicated with respect to one another.

Figure 6:
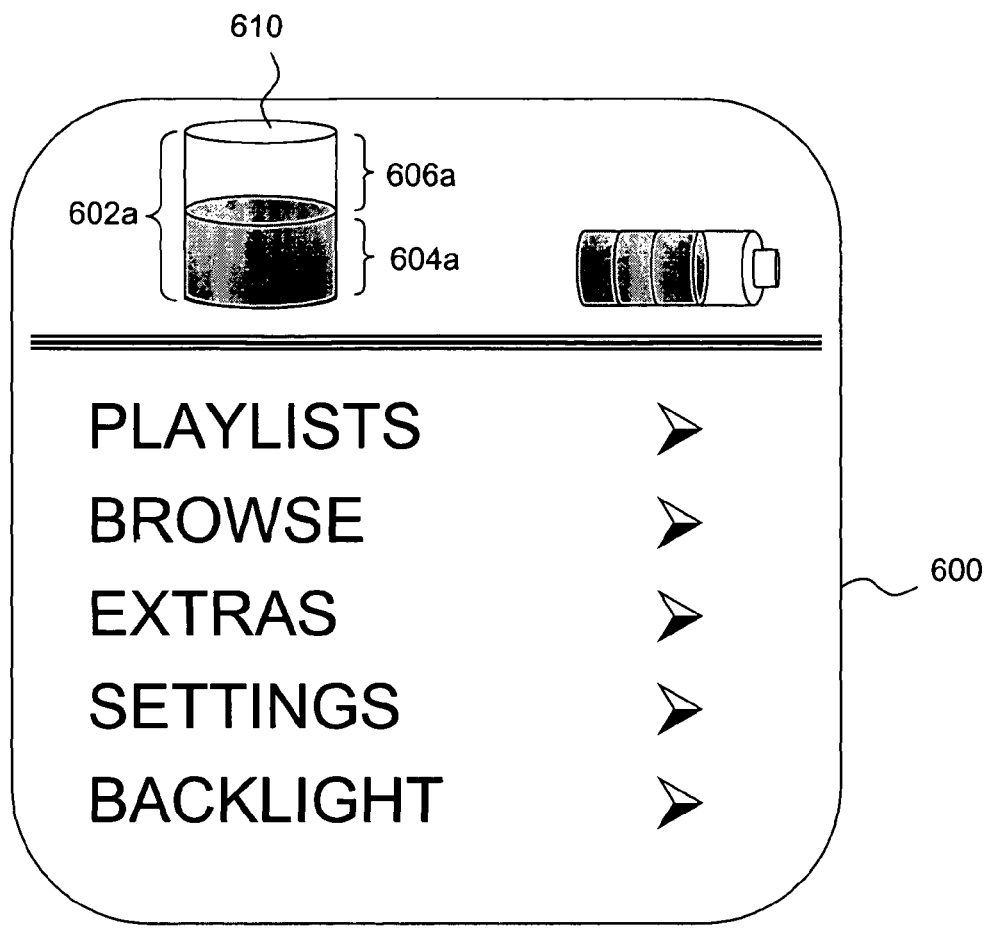
FIG. 6 illustrates elapsed and allotted playback duration indicators in accordance with various embodiments of the present invention.
Figure 6:
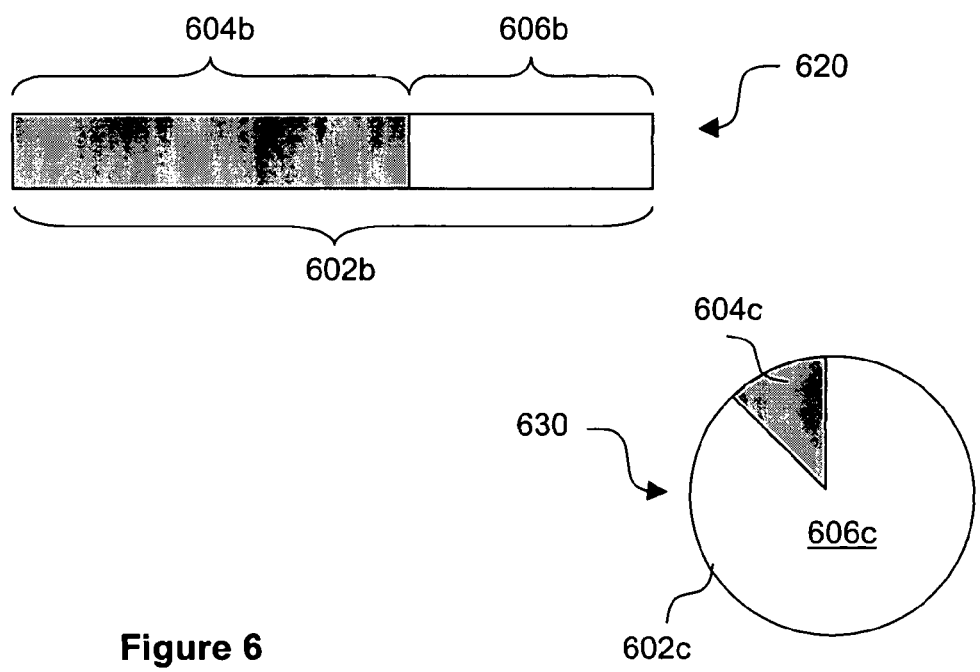

FIG. 6 illustrates example elapsed and allotted playback duration indicators in accordance with various embodiments of the present invention. More specifically, FIG. 6 illustrates duration indicators 610, 620 and 630. Each of duration indicators 610, 620 and 630 indicate an allotted playback duration for the playback device 602a, 602b and 602c, as well as an elapsed playback duration for the playback device 606a, 606b and 606c. Additionally, duration indicators 610, 620 and 630 further indicate a playback duration remaining for the device 604a, 604b, and 604c. In one embodiment of the invention, the duration indicators may be updated at various intervals whether the intervals are periodic or otherwise. Accordingly, users can be made aware of the content playback duration remaining for a particular device and can choose to reconnect the playback device to a content server (or intermediate client device) to recharge the associated playback rights prior to the allotted playback duration expiring.

Figure 8:
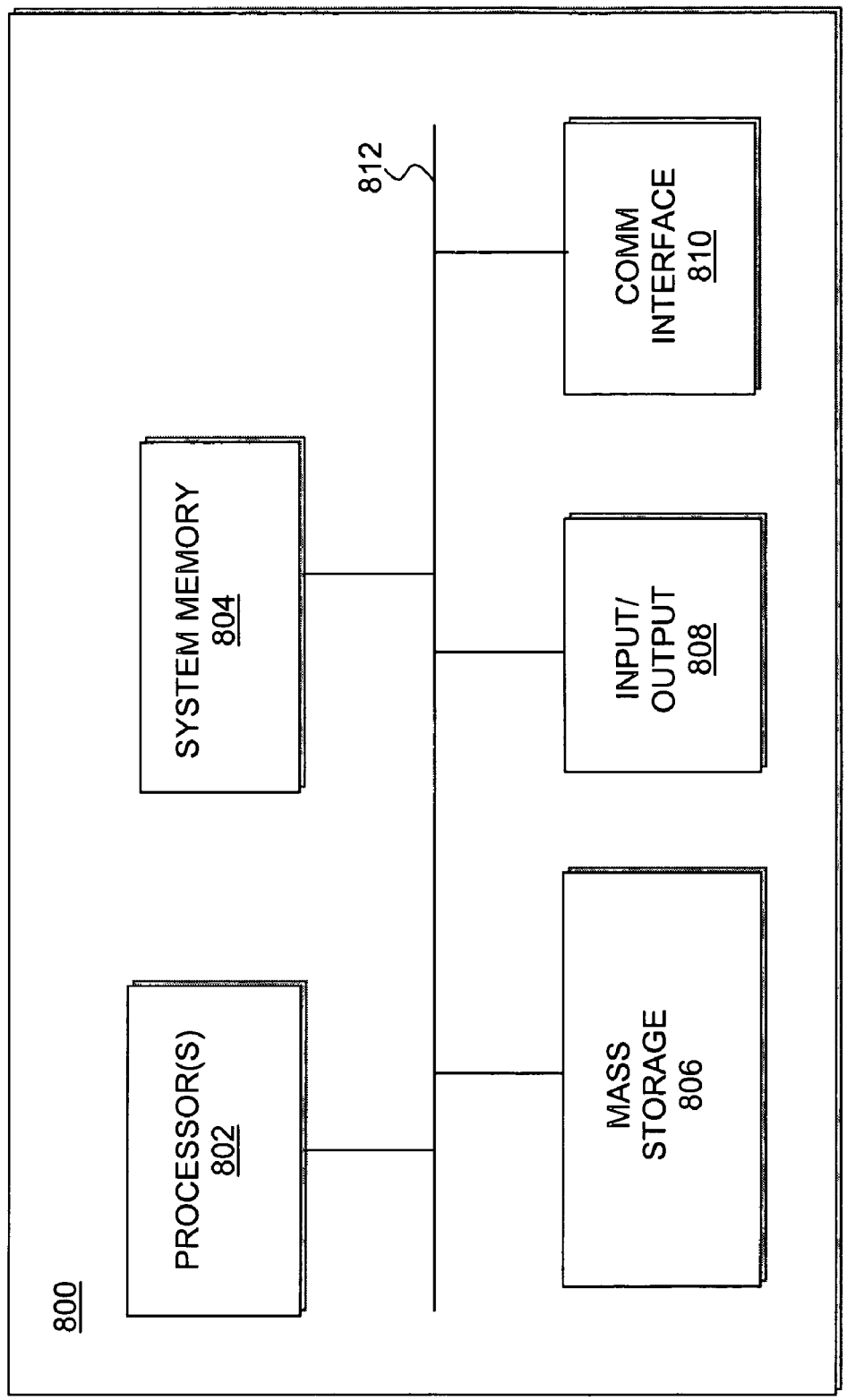
FIG. 8 illustrates an example system architecture suitable for practicing the present invention in accordance with one embodiment.

Reference is now made to FIG. 8 where an example system architecture suitable for practicing the present invention in accordance with one embodiment is illustrated. In one embodiment, system 800 may represent one or more of playback devices 130, 135, 140 and 150. As shown, system 800 may include one or more processors 802 and system memory 804. System memory 804 may represent ROM such as EEPROM, Flash and the like, and system memory 804 may represent RAM such as SDRAM, DRAM and the like. Additionally, system 800 may include one or more mass storage device(s) 806 (such as diskette, hard drive, DVDROM, DVDRAM, CDROM and so forth), and a general-purpose input/output interface (GPIO) 808 (for interfacing input/output devices such as keyboard, cursor control and so forth). System 800, may further include one or more communication interfaces 810 (such as network interface cards, modems, wireless interface, USB bus, IEEE 802.11 or IEEE 1394 bus connections, and so forth).

The elements of system 800 are coupled with each other via system bus 812, which represents one or more buses. In the case of multiple buses, they may be bridged by one or more bus bridges (not shown). Except for the teachings of the present invention as incorporated herein, each of these elements performs its conventional functions known in the art. In particular, storage units such as system memory 804 and mass storage 806, may be employed to store a working copy and a permanent copy of the programming instructions implementing the earlier described rights monitoring logic incorporating teachings of the present invention. The permanent copy of the programming instructions may be loaded into mass storage 806 in the factory, or in the field, through a distribution medium, such as computer readable medium, including but not limited to magnetic, optical, and other medium of the like (not shown) or through communication interface 810.

Epilog

While the present invention has been described in terms of the above-illustrated embodiments, those skilled in the art will recognize that the invention is not limited to the embodiments described. The present invention can be practiced with modification and alteration within the spirit and scope of the appended claims. Thus, the description is to be regarded as illustrative instead of restrictive on the present invention.

What is claimed is:

1. In a client device, a method comprising:
receiving a request for playback of digital audio or video content stored on the device, wherein the requested digital audio or video content is included within a particular body of content comprising a plurality of digital audio or video contents accessible by the client device;
determining an allotted playback duration granted to the device for playing back the particular body of content;
determining an elapsed playback duration for the device, the elapsed playback duration representing an amount of time previously consumed by the device while rendering the digital audio or video contents of the particular body of content;
determining whether a predetermined relationship between the elapsed playback duration and the allotted playback duration granted to the device is satisfied; and
regulating playback of the particular body of content if the predetermined relationship between the elapsed playback duration and the allotted playback duration granted to the device is determined to be satisfied.

2. The method of claim 1, wherein the request for playback of digital audio or video content is received via a user input device.

3. The method of claim 1, wherein playback of the requested digital audio or video content track is denied if it is determined that the relationship between the allotted playback duration and elapsed playback duration is satisfied.

4. The method of claim 3, further comprising:
facilitating playback of the requested digital audio content if it is determined that the elapsed playback duration does not exceed the allotted playback duration.

5. The method of claim 3, further comprising:
indicating to the user at least one of the elapsed playback duration and the allotted playback duration.

6. The method of claim 3, further comprising:
indicating to the user the elapsed playback duration in relation to the allotted playback duration.

7. The method of claim 6, wherein the digital audio or video content is encoded in accordance with at least one of an advanced audio encoding algorithm, an adaptive multi-rate encoding algorithm and an MP3 encoding algorithm.

8. The method of claim 1, further comprising:
denying playback of the requested digital audio or video content if the elapsed playback duration added to a run length associated with the requested content exceeds the allotted playback duration.

9. The method of claim 1, further comprising:
denying playback of additional digital audio or video content stored on the device in addition to the requested digital audio or video content if it is determined that the elapsed playback duration is equal to or exceeds the allotted playback duration.

10. The method of claim 9, wherein the allotted playback duration is increased based upon entitlements granted to the user by a service provider.

11. The method of claim 1, wherein the allotted playback duration is determined based upon rights intrinsic to the device.

12. The method of claim 1, wherein the allotted playback duration is determined based upon data received from a content server.

13. The method of claim 1, further comprising:
periodically increasing the allotted playback duration prior to the allotted playback duration exceeding the elapsed playback duration.

14. In a digital content rendering device, a method comprising:
rendering one of a plurality of digital audio or video content items within a particular body of content;
determining an elapsed playback duration for which the digital audio or video content of the particular body of content has been rendered; and
regulating further content rendering of the particular body of content by the digital content rendering device if the elapsed playback duration satisfies a predetermined relationship with respect to an allotted playback duration granted to the device for playing back the particular body of content.

15. The method of claim 14, wherein the elapsed playback duration represents an amount of time for which content of the particular body of content has been rendered by the digital content rendering device.

16. The method of claim 14, wherein regulating comprises denying further content rendering of the particular body of content by the digital content rendering device if the elapsed playback duration satisfies a predetermined relationship with respect to the allotted playback duration.

17. The method of claim 16, wherein the allotted playback duration represents at least one of an amount of render time for which content of the particular body of content may be rendered on the digital content rendering device, and a quantity of data that may be processed by the digital content rendering device to render content of the particular body of content on the device.

18. The method of claim 17, further comprising:
facilitating playback of the digital audio content of the particular body of content if it is determined that the elapsed playback duration does not exceed the amount of render time corresponding to allotted playback right.

19. In a digital content rendering device, a method comprising:
  identifying a playback right granted to the digital content rendering device representing an allotted measure of a plurality of digital audio or video content within a particular body of content that may be rendered by the digital content rendering device;
  determining whether the allotted measure of content for the particular body of content has been rendered by the device; and
  preventing further content rendering from the particular body of content on the digital content rendering device if it is determined that the allotted measure of digital audio or video content for the particular body of content that may be rendered by the digital content rendering device has previously been rendered by the device.

20. The method of claim 19, wherein the allotted measure of the plurality of digital audio or video content within the particular body of content that may be rendered represents an amount of time that the digital content rendering device may render the digital audio or video content of the particular body of content.

21. The method of claim 19, wherein the playback right associated with the digital content rendering device is further associated with a user, and wherein the user is denied playback of any additional content items by the digital content rendering device once it is determined that the allotted measure of digital audio or video content for the particular body of content that may be rendered by the digital content rendering device has previously been rendered by the device.

22. The method of claim 21, wherein the playback right is determined based upon a subscription agreement between the user and a content provider.

23. A digital content rendering apparatus comprising:
  a storage medium having stored therein programming instructions designed to enable the apparatus to
  receive a request for playback of digital audio or video content stored on the apparatus, wherein the requested digital audio or video content is included within a particular body of content comprising a plurality of digital audio or video contents accessible by the apparatus,
  determine an allotted playback duration granted to the apparatus for playing back the particular body of content,
  determine an elapsed playback duration for the apparatus, the elapsed playback duration representing an amount of time previously consumed by the apparatus while rendering the digital audio or video contents of the particular body of content,
  determine whether a predetermined relationship between the elapsed playback duration and the allotted playback duration granted to the apparatus is satisfied, and
  regulate playback of the particular body of content if the predetermined relationship between the elapsed playback duration and the allotted playback duration granted to the apparatus is determined to be satisfied; and
  at least one processor coupled with the storage medium to execute the programming instructions.

24. A digital content rendering apparatus comprising:
  a storage medium having stored therein programming instructions designed to enable the apparatus to
  render one of a plurality of digital audio or video content items within a particular body of content,
  determine an elapsed playback duration for which the digital audio or video content of the particular body of content has been rendered, and
  regulate further content rendering of the particular body of content by the digital content rendering apparatus if the elapsed playback duration satisfies a predetermined relationship with respect to an allotted playback duration granted to the digital content rendering apparatus for playing back the particular body of content; and
  at least one processor coupled with the storage medium to execute the programming instructions.

25. A digital content rendering apparatus comprising:
  a storage medium having stored therein programming instructions designed to enable the digital content rendering apparatus to
  identify a playback right granted to the digital content rendering apparatus representing an allotted measure of a plurality of digital audio or video content within a particular body of content that may be rendered by the digital content rendering apparatus,
  determine whether the allotted measure of content for the particular body of content has been rendered by the apparatus, and
  prevent further content rendering from the particular body of content on the digital content rendering apparatus if it is determined that the allotted measure of digital audio or video content for the particular body of content that may be rendered by the digital content rendering apparatus has previously been rendered by the apparatus; and
  at least one processor coupled with the storage medium to execute the programming instructions.

26. A machine readable medium having stored thereon machine executable instructions, the execution of which to implement a method comprising:
  receiving a request for playback of digital audio or video content stored on the device, wherein the requested digital audio or video content is included within a particular body of content comprising a plurality of digital audio or video contents accessible by the client device;
  determining an allotted playback duration granted to the device for playing back the particular body of content;
  determining an elapsed playback duration for the device, the elapsed playback duration representing an amount of time previously consumed by the device while rendering the digital audio or video contents of the particular body of content;
  determining whether a predetermined relationship between the elapsed playback duration and the allotted playback duration granted to the device is satisfied; and
  regulating playback of the particular body of content if the predetermined relationship between the elapsed playback duration and the allotted playback duration granted to the device is determined to be satisfied.

27. A machine readable medium having stored thereon machine executable instructions, the execution of which to implement a method comprising:
  rendering one of a plurality of digital audio or video content items within a particular body of content;
  determining an elapsed playback duration for which the digital audio or video content of the particular body of content has been rendered; and
  regulating further content rendering of the particular body of content by the digital content rendering device if the elapsed playback duration satisfies a predetermined relationship with respect to an allotted playback dura tion granted to the device for playing back the particular body of content.

28. A machine readable medium having stored thereon machine executable instructions, the execution of which to implement a method comprising:

identifying a playback right granted to the digital content rendering device representing an allotted measure of a plurality of digital audio or video content within a particular body of content that may be rendered by the digital content rendering device;

determining whether the allotted measure of content for the particular body of content has been rendered by the device; and preventing further content rendering from the particular body of content on the digital content rendering device if it is determined that the allotted measure of digital audio or video content for the particular body of content that may be rendered by the digital content rendering device has previously been rendered by the device.

* * * * *